United States Patent
Naik et al.

(10) Patent No.: US 9,008,660 B2
(45) Date of Patent: Apr. 14, 2015

(54) METHOD TO IMPROVE REESTABLISHMENT SUCCESS RATE IN LTE SYSTEM-AT SOURCE ENB DURING PING PONGS

(75) Inventors: Vivek Naik, Deerfield, IL (US); Venkataramanan Narayanan, Huntley, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 542 days.

(21) Appl. No.: 13/409,528

(22) Filed: Mar. 1, 2012

(65) Prior Publication Data

US 2013/0231086 A1    Sep. 5, 2013

(51) Int. Cl.
*H04W 36/00*    (2009.01)
*H04W 36/02*    (2009.01)

(52) U.S. Cl.
CPC ........ *H04W 36/0055* (2013.01); *H04W 36/023* (2013.01)

(58) Field of Classification Search
USPC .................................. 455/411, 436; 370/338
See application file for complete search history.

(56) References Cited

U.S. PATENT DOCUMENTS

| | | | |
|---|---|---|---|
| 2011/0039552 A1* | 2/2011 | Narasimha et al. ........... | 455/425 |
| 2011/0294508 A1* | 12/2011 | Min et al. ...................... | 455/436 |

FOREIGN PATENT DOCUMENTS

| | | |
|---|---|---|
| WO | WO-2008/042889 A1 | 4/2008 |
| WO | WO-2011/149316 A2 | 12/2011 |

OTHER PUBLICATIONS

Huawei; "Source cell detection and correction of too-early handover"; 3GPP TSG-RAN WG3 #65, R3-091764; Aug. 24-28, 2009; Shenzhen, China; whole document (3 pages).
ZTE et al.; "Handover Cause Report for Mobility Robustness Optimization"; 3GPP TSG-RAN WG3 #66, R3-092982; Nov. 9-13, 2009; Jeju, Korea; whole document (4 pages).
Ericsson; "MRO for HetNet mobility scenarios"; 3GPP TSG-RAN WG3 #73bis, R3-112599; Oct. 10-14, 2011; Zhuhai, China; whole document (6 pages).
Alcatel-Lucent; "Co-existence of MRO detection methods"; 3GPP TSG-RAN WG3 #74, R3-112968; Nov. 14-18, 2011; San Francisco, USA; whole document (4 pages).
"$3^{rd}$ Generation Partnershp Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.12.0, Mar. 2010, 149 pgs.

(Continued)

*Primary Examiner* — Marcos Batista
(74) *Attorney, Agent, or Firm* — Harrington & Smith

(57) ABSTRACT

A method to perform successful RRC reestablishment across eNB seams in ping pong scenarios without data loss is described. The method includes, during a handover procedure of a UE from a source AP to a target AP, receiving, at the source AP, a reestablishment request from the UE. The reestablishment request includes a temporary identity assigned by the target AP for the UE. The method also includes determining a UE context based on the temporary identity assigned by the target AP and performing a reestablishment procedure between the source AP and the UE. Apparatus and computer readable media are also described.

20 Claims, 6 Drawing Sheets

(56) References Cited

OTHER PUBLICATIONS

"3rd Generation Partnershp Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", 3GPP TS 36.300 V9.9.0, Dec. 2011, 174 pgs.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.6.0, Dec. 2012, 194 pgs.

"3rd Generation Partnershp Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.0.0, Dec. 2011, 194 pgs.

"3rd Generation Partnership Project; Technical Specification Group Radio Access Network; Requirements for further advancements for Evolved Universal Terrestrial Radio Access (E-UTRA) (LTE-Advanced) (Release 8)", 3GPP TR 36.913 V8.0.1, Mar. 2009), 15 pgs.

"3rd Generation Partnership Project; Technical Specification Group Radio Access Network; Requirements for further advancements for Evolved Universal Terrestrial Radio Access (E-UTRA) (LTE-Advanced) (Release 9)", 3GPP TR 36.913 V9.0.0, Dec. 2009, 15 pgs.

"3rd Generation Partnership Project; Technical Specification Group Radio Access Network; Requirements for further advancements for Evolved Terrestrial Radio Access (E-UTRA) (LTE-Advanced) (Release 10)", 3GPP TR 36.913 V10.0.0, Mar. 2011, 15 pgs.

"3rd Generaton Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.4.0. Dec. 2011, 296 pgs.

* cited by examiner

METHOD TO IMPROVE REESTABLISHMENT SUCCESS RATE IN LTE SYSTEM-AT SOURCE ENB DURING PING PONGS

TECHNICAL FIELD

The exemplary and non-limiting embodiments of this invention relate generally to wireless communication systems, methods, devices and computer programs and, more specifically, relate to reestablishment procedures.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
AP access point
BW bandwidth
CC component carrier
CDM code division multiplexing
C-RNTI cell radio network temporary identity
DL downlink (eNB towards UE)
eNB E-UTRAN Node B (evolved Node B)
EPC evolved packet core
E-UTRAN evolved UTRAN (LTE)
HARQ hybrid automatic repeat request
HO handover
IMT-A international mobile telephony-advanced
ITU international telecommunication union
ITU-R ITU radiocommunication sector
LTE long term evolution of UTRAN (E-UTRAN)
MAC medium access control (layer 2, L2)
MAC-I message authentication code for data integrity of messages
MM/MME mobility management/mobility management entity
Node B base station
O&M operations and maintenance
OFDMA orthogonal frequency division multiple access
PCI physical cell identity
PDCP packet data convergence protocol
PHY physical (layer 1, L1)
RLC radio link control
RRC radio resource control
RRM radio resource management
SC-FDMA single carrier, frequency division multiple access
S-GW serving gateway
UE user equipment, such as a mobile station or mobile terminal
UL uplink (UE towards eNB)
UTRAN universal terrestrial radio access network The specification of a communication system known as evolved UTRAN (E-UTRAN, also referred to as UTRAN-LTE or as E-UTRA) is currently nearing completion within the 3GPP. As specified the DL access technique is OFDMA, and the UL access technique is SC-FDMA.

One specification of interest is 3GPP TS 36.300, V8.12.0 (2010-04), "3rd Generation Partnership Project; Technical Specification Group Radio Access Network; Evolved Universal Terrestrial Radio Access (E UTRA) and Evolved Universal Terrestrial Access Network (E UTRAN); Overall description; Stage 2 (Release 8)," incorporated by reference herein in its entirety. This system may be referred to for convenience as LTE Rel-8 (which also contains 3G HSPA and its improvements). In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300, V9.9.0 (2011-12), incorporated by reference herein in its entirety, and Release 10 versions of at least some of these specifications have been published including 3GPP TS 36.300, V10.6.0 (2011-12), incorporated by reference herein in its entirety. Even more recently, Release 11 versions of at least some of these specifications have been published including 3GPP TS 36.300, V11.0.0 (2011-12), incorporated by reference herein in its entirety.

FIG. 1 reproduces FIG. 4-1 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE (not shown). The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many-to-many relationship between MMEs/S-GW and eNBs.

The eNB hosts the following functions:
functions for RRM: Radio Bearer Control, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the Serving Gateway;
scheduling and transmission of paging messages (originated from the MME);
scheduling and transmission of broadcast information (originated from the MME or O&M); and
a measurement and measurement reporting configuration for mobility and scheduling.

Of particular interest herein are the further releases of 3GPP LTE (e.g., LTE Rel-10) targeted towards future IMT-A systems, referred to herein for convenience simply as LTE-Advanced (LTE-A). Reference in this regard may be made to 3GPP TR 36.913, V8.0.1 (2009 03), 3rd Generation Partnership Project; Technical Specification Group Radio Access Network; Requirements for Further Advancements for E UTRA (LTE-Advanced) (Release 8), incorporated by reference herein in its entirety. A goal of LTE-A is to provide significantly enhanced services by means of higher data rates and lower latency with reduced cost. LTE-A is directed toward extending and optimizing the 3GPP LTE Rel-8 radio access technologies to provide higher data rates at very low cost. LTE-A will most likely be part of LTE Rel-10. LTE-A will be a more optimized radio system fulfilling the ITU-R requirements for IMT-A while maintaining backward compatibility with LTE Rel-8. Reference is further made to a Release 9 version of 3GPP TR 36.913, V9.0.0 (2009-12), incorporated by reference herein in its entirety. Reference is also made to a Release 10 version of 3GPP TR 36.913, V10.0.0 (2011-06), incorporated by reference herein in its entirety.

In LTE system, if the UE loses a radio frequency (RF) connection to an access point (AP) (for example, an eNB, a relay node, etc.), the UE may use an RRC Reestablishment procedure to establish the RF connection. The UE is allowed to use the RRC Reestablishment procedures in the following scenarios inter-eNB (Intra/Inter cell) reestablishment and inter-eNB reestablishement when the UE uses the source cell C-RNTI and attempt the RRC Reestablishment procedures in a prepared/alternate cell.

FIG. 2 illustrates an exemplary handover situation. As shown the UE 220 is located within a source cell 215 served by source eNB 210 and a target cell 235 served by target eNB 230. In this situation, the UE 220 is connected to the source cell 215 and is being handed over to the target cell 235. As shown, UE 220 is on the edge of target cell 235 (e.g., on the eNB seam). During the handover procedure, UE 220 may lose the connection to the target cell 235. After an unsuccessful inter-eNodeB handover, the UE may attempt to return to the source eNB 210 (or ping-pong).

During the handover procedure, the UE 220 is configured for operation in the target cell 235. However, if the connection is lost certain messages may not be received by the UE 220. In these situations, the UE 220 may then attempt to return to the source eNB 210 based on the RF conditions but may be using the incorrect configuration/parameters. For example, the target eNB 230 may assign a cell radio network temporary identity (C-RNTI) to the UE 220. If the UE 220 uses the target eNB's C-RNTI with the source eNB 210, the source eNB 210 may not be able to locate the correct UE context because the C-RNTI is an identity that is unique within an eNB (here the target eNB). This causes the reestablishment procedure to fail. This situation is described as a "Too Early Handover" problem.

Conventional techniques to deal with this "Too Early Handover" problem, focus optimizing the HO parameters in order to minimize the chances that the problem occurs. However, these techniques do not help to minimize the impact of failures that still manage to occur.

The occurrence of the problem with reestablishment procedures will tend to increase as the network has more ping pong scenarios along inter-eNB seams. As the network operators start deploying small cells, the inter eNB seams will increase. Thus, there is a risk that the IA/LCs in the network may increase.

What is needed is a technique to allow the source eNB to quickly locate the correct UE context in order to reduce connection delays and/or lost calls when a "Too Early Handover" problem occurs.

SUMMARY

The below summary section is intended to be merely exemplary and non-limiting.

The foregoing and other problems are overcome, and other advantages are realized, by the use of the exemplary embodiments of this invention.

In a first aspect thereof an exemplary embodiment of this invention provides a method to perform successful RRC reestablishment across eNB seams in ping pong scenarios without data loss. The method includes, during a handover procedure of a UE from a source AP to a target AP, receiving, at the source AP, a reestablishment request from the UE. The reestablishment request includes a temporary identity assigned by the target AP for the UE. The method also includes determining a UE context based on the temporary identity assigned by the target AP and performing a reestablishment procedure between the source AP and the UE.

In a further aspect thereof an exemplary embodiment of this invention provides an apparatus to perform successful RRC reestablishment across eNB seams in ping pong scenarios without data loss. The apparatus includes at least one processor; and at least one memory including computer program code. The at least one memory and the computer program code are configured to, with the at least one processor, cause the apparatus to perform actions. The actions include, during a handover procedure of a UE from a source AP to a target AP, to receive, at the source AP, a reestablishment request from the UE. The reestablishment request includes a temporary identity assigned by the target AP for the UE. The actions also include to determine a UE context based on the temporary identity assigned by the target AP and performing a reestablishment procedure between the source AP and the UE.

In another aspect thereof an exemplary embodiment of this invention provides a computer readable medium to perform successful RRC reestablishment across eNB seams in ping pong scenarios without data loss. The computer readable medium is tangibly encoded with a computer program executable by a processor to perform actions. The actions include, during a handover procedure of a UE from a source AP to a target AP, receiving, at the source AP, a reestablishment request from the UE. The reestablishment request includes a temporary identity assigned by the target AP for the UE. The actions also include determining a UE context based on the temporary identity assigned by the target AP and to perform a reestablishment procedure between the source AP and the UE.

In a further aspect thereof an exemplary embodiment of this invention provides an apparatus to perform successful RRC reestablishment across eNB seams in ping pong scenarios without data loss. The apparatus includes means for, during a handover procedure of a UE from a source AP to a target AP, receiving, at the source AP, a reestablishment request from the UE. The reestablishment request includes a temporary identity assigned by the target AP for the UE. The apparatus also includes means for determining a UE context based on the temporary identity assigned by the target AP and means for performing a reestablishment procedure between the source AP and the UE.

In a further aspect thereof an exemplary embodiment of this invention provides an apparatus to perform successful RRC reestablishment across eNB seams in ping pong scenarios without data loss when the source eNB is on a cell different than the one which the UE was previously active. The apparatus includes means for, during a handover procedure of a UE from a source eNB to a target eNB, receiving, in an accessed cell served by the source eNB, a reestablishment request from the UE. The reestablishment request includes a temporary identity assigned by the target eNB for the UE which is used to determine the cell on the source eNB which had the UE context before the handover. The apparatus also includes means for determining a UE context based on the temporary identity assigned by the target eNB and means for performing a reestablishment procedure between the accessed source eNB cell and the UE using the context information available at the previously active source eNB cell.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Various exemplary embodiments in accordance with this invention provide techniques to perform successful RRC reestablishment across eNB seams in ping pong scenarios. As a non-limiting example, the source eNB associates the C-RNTI from the target eNB with the UE context. Then, when the eNB receives a reestablishment request from the UE using the C-RNTI from the target eNB, the source eNB is able to determine the correct UE context using the previously associated C-RNTI from the target eNB and perform the reestablishment procedure.

As used herein, the term "access point" (AP) is used to refer to any device (either stationary or mobile) used to allow another device (either stationary or mobile) to communicate with a network, for example, an access point may be a router, a basestation, a relay station, an eNB, a wireless modem, etc. An AP may serve a single cell or a plurality of cells. Each cell of an AP may use the same communication technology (e.g., LTE, CDMA, WLAN, etc.). Alternatively, cells of an AP may use different communication technologies.

Figure 3:
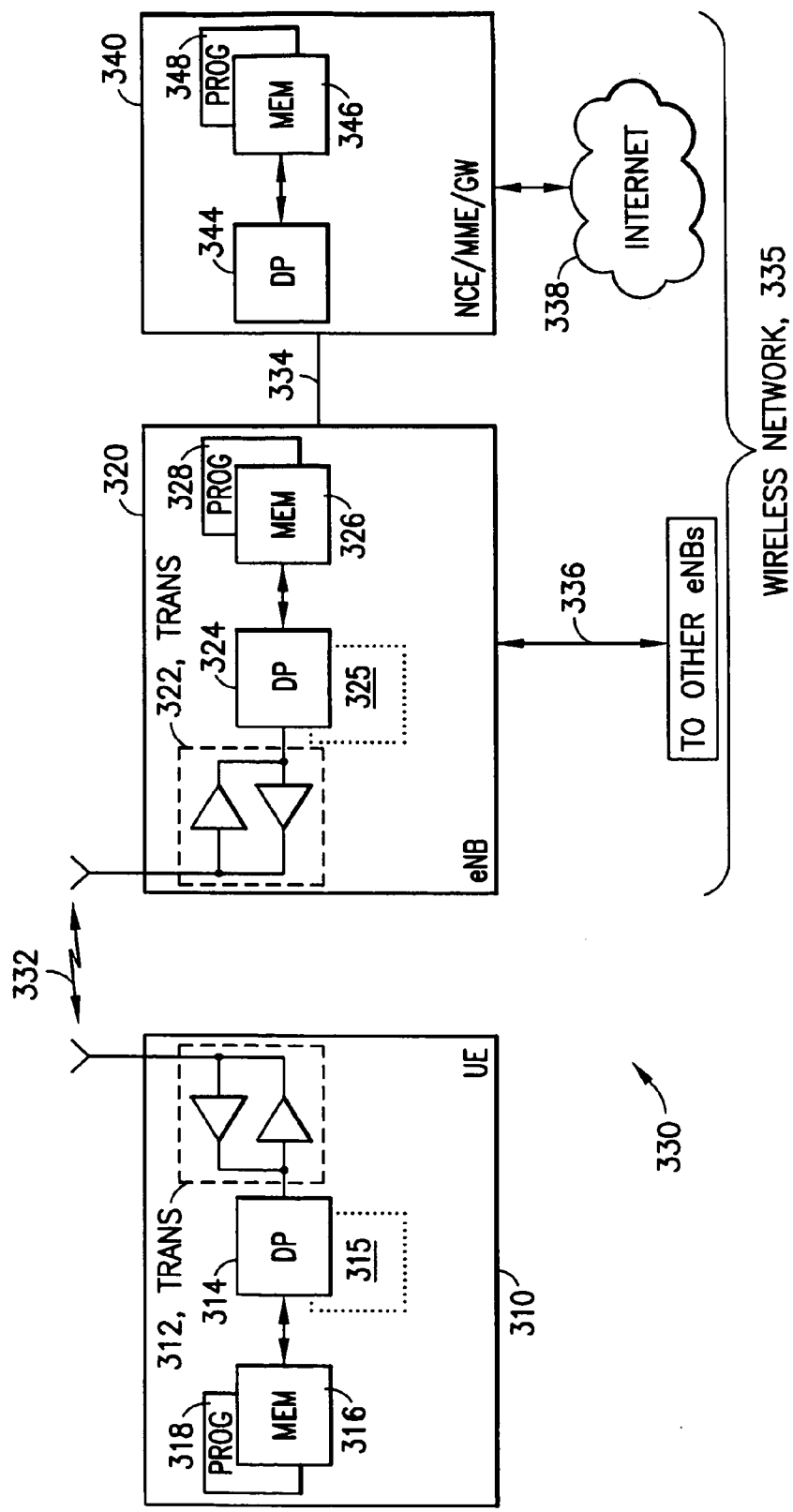
FIG. 3 shows a simplified block diagram of exemplary electronic devices that are suitable for use in practicing various exemplary embodiments of this invention.

Before describing in further detail various exemplary embodiments of this invention, reference is made to FIG. 3 for illustrating a simplified block diagram of various electronic devices and apparatus that are suitable for use in practicing exemplary embodiments of this invention.

Figure 1:
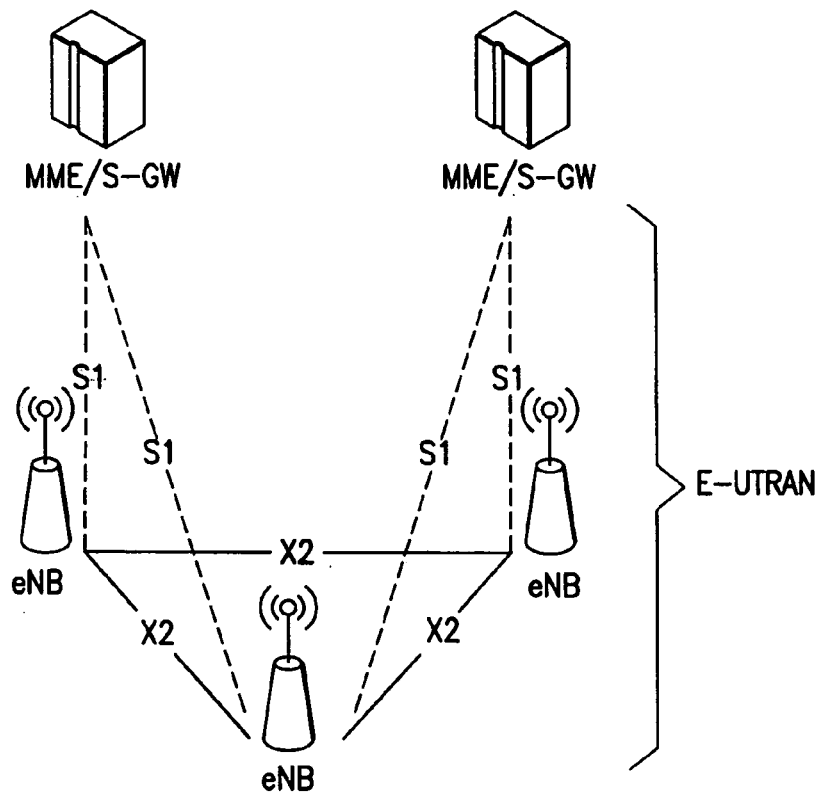
FIG. 1 reproduces FIG. 4-1 of 3GPP TS 36.300, and shows the overall architecture of the E UTRAN system.
Figure 2:
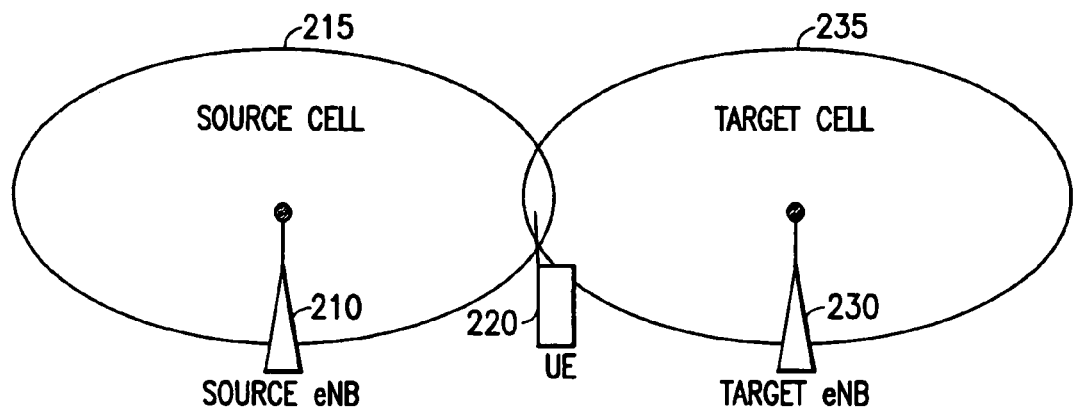
FIG. 2 illustrates an exemplary handover situation.

In the wireless system 330 of FIG. 3, a wireless network 335 is adapted for communication over a wireless link 332 with an apparatus, such as a mobile communication device which may be referred to as a UE 310, via a network access node, such as a Node B (base station), and more specifically an eNB 320. The eNB 320 serves as an access point (AP) such that the UE 310 may communicate with the network. The network 335 may include a network control element (NCE) 340 that may include the MME/SGW functionality shown in FIG. 1, and which provides connectivity with a network, such as a telephone network and/or a data communications network (e.g., the internet 338).

The UE 310 includes a controller, such as a computer or a data processor (DP) 314, a computer-readable memory medium embodied as a memory (MEM) 316 that stores a program of computer instructions (PROG) 318, and a suitable wireless interface, such as radio frequency (RF) transceiver 312, for bidirectional wireless communications with the eNB 320 via one or more antennas.

The eNB 320 also includes a controller, such as a computer or a data processor (DP) 324, a computer-readable memory medium embodied as a memory (MEM) 326 that stores a program of computer instructions (PROG) 328, and a suitable wireless interface, such as RF transceiver 322, for communication with the UE 310 via one or more antennas. The eNB 320 is coupled via a data/control path 334 to the NCE 340. The path 334 may be implemented as the S1 interface shown in FIG. 1. The eNB 320 may also be coupled to another eNB via data/control path 336, which may be implemented as the X2 interface shown in FIG. 1.

The NCE 340 includes a controller, such as a computer or a data processor (DP) 344, a computer-readable memory medium embodied as a memory (MEM) 346 that stores a program of computer instructions (PROG) 348.

At least one of the PROGs 318, 328 and 348 is assumed to include program instructions that, when executed by the associated DP, enable the device to operate in accordance with exemplary embodiments of this invention, as will be discussed below in greater detail.

That is, various exemplary embodiments of this invention may be implemented at least in part by computer software executable by the DP 314 of the UE 310; by the DP 324 of the eNB 320; and/or by the DP 344 of the NCE 340, or by hardware, or by a combination of software and hardware (and firmware).

The UE 310 and the eNB 320 may also include dedicated processors, for example RRC protocol layer module 315 and RRC protocol layer module 325.

In general, the various embodiments of the UE 310 can include, but are not limited to, cellular telephones, tablets having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 316, 326 and 346 may be of any type suitable to the local technical environment and may be implemented using any suitable data storage technology, such as semiconductor based memory devices, flash memory, magnetic memory devices and systems, optical memory devices and systems, fixed memory and removable memory. The DPs 314, 324 and 344 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 312 and 322) may be of any type suitable to the local technical environment and may be implemented using any suitable communication technology such as individual transmitters, receivers, transceivers or a combination of such components.

Figure 4:
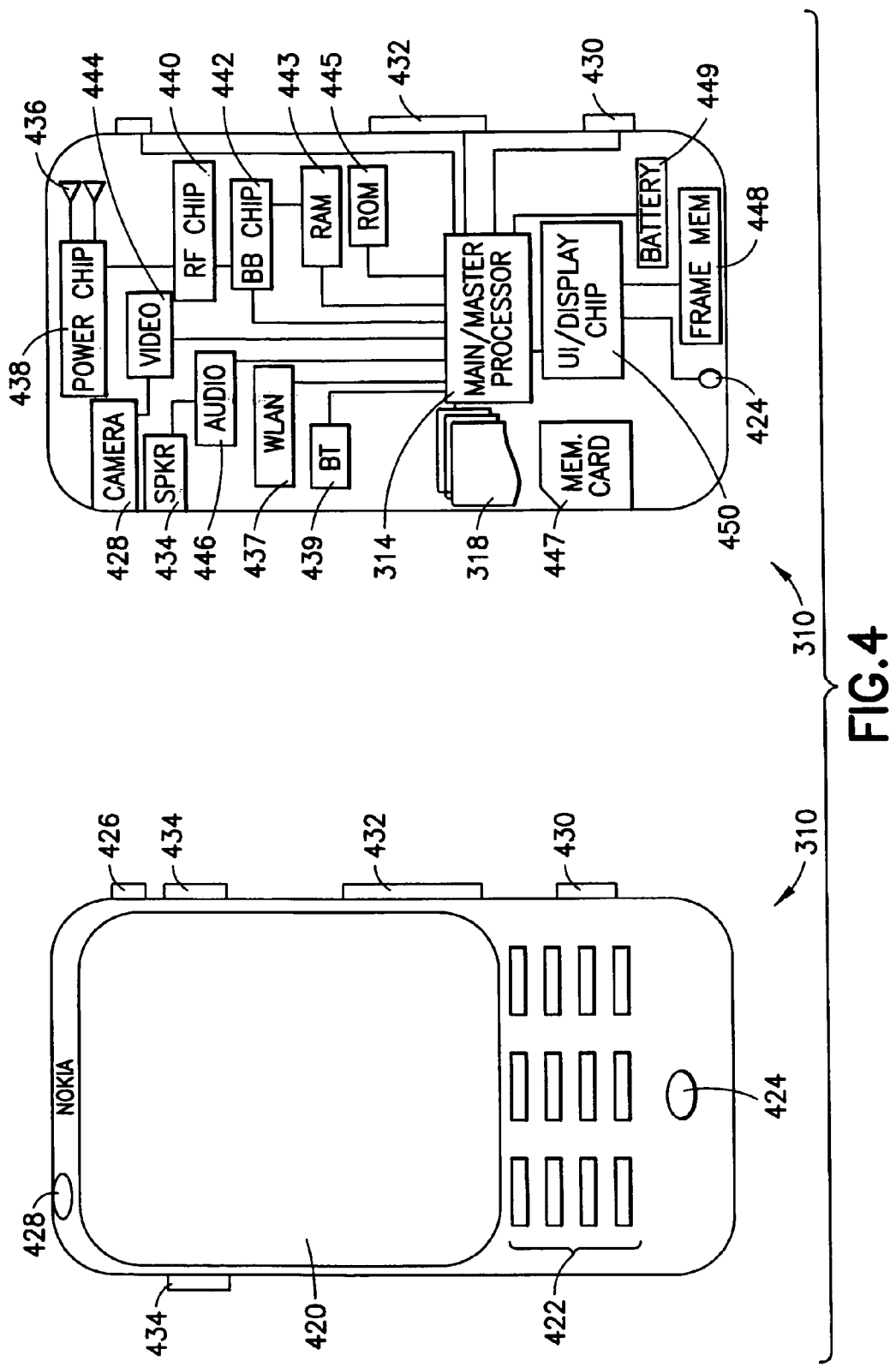
FIG. 4 shows a more particularized block diagram of an exemplary user equipment such as that shown at FIG. 3.

FIG. 4 illustrates further detail of an exemplary UE in both plan view (left) and sectional view (right), and the invention may be embodied in one or some combination of those more function-specific components. At FIG. 4 the UE 310 has a graphical display interface 420 and a user interface 422 illustrated as a keypad but understood as also encompassing touch-screen technology at the graphical display interface 420 and voice-recognition technology received at the microphone 424. A power actuator 426 controls the device being turned on and off by the user. The exemplary UE 310 may have a camera 428 which is shown as being forward facing (e.g., for video calls) but may alternatively or additionally be rearward facing (e.g., for capturing images and video for local storage). The camera 428 is controlled by a shutter actuator 430 and optionally by a zoom actuator 432 which may alternatively function as a volume adjustment for the speaker(s) 434 when the camera 428 is not in an active mode.

Within the sectional view of FIG. 4 are seen multiple transmit/receive antennas 436 that are typically used for cellular communication. The antennas 436 may be multi-band for use with other radios in the UE. The operable ground plane for the antennas 436 is shown by shading as spanning the entire space enclosed by the UE housing though in some embodiments the ground plane may be limited to a smaller area, such as disposed on a printed wiring board on which the power chip 438 is formed. The power chip 438 controls power amplification on the channels being transmitted and/or across the antennas that transmit simultaneously where spatial diversity is used, and amplifies the received signals. The power chip 438 outputs the amplified received signal to the radio-frequency (RF) chip 440 which demodulates and downconverts the signal for baseband processing. The baseband (BB) chip 442 detects the signal which is then converted to a bit-stream and finally decoded. Similar processing occurs in reverse for signals generated in the apparatus 310 and transmitted from it.

Signals to and from the camera 428 pass through an image/video processor 444 which encodes and decodes the various image frames. A separate audio processor 446 may also be present controlling signals to and from the speakers 434 and the microphone 424. The graphical display interface 420 is refreshed from a frame memory 448 as controlled by a user interface chip 450 which may process signals to and from the display interface 420 and/or additionally process user inputs from the keypad 422 and elsewhere.

Certain embodiments of the UE 310 may also include one or more secondary radios such as a wireless local area network radio WLAN 437 and a Bluetooth® radio 439, which may incorporate an antenna on-chip or be coupled to an off-chip antenna. Throughout the apparatus are various memories such as random access memory RAM 443, read only memory ROM 445, and in some embodiments removable memory such as the illustrated memory card 447. The various programs 318 are stored in one or more of these memories. All of these components within the UE 310 are normally powered by a portable power supply such as a battery 449.

Processors 438, 440, 442, 444, 446, 450, if embodied as separate entities in a UE 310 or eNB 320, may operate in a slave relationship to the main processor 314, 324, which may then be in a master relationship to them. Embodiments of this invention are most relevant to the RRC protocol layer module 325, though it is noted that other embodiments need not be disposed there but may be disposed across various chips and memories as shown or disposed within another processor that combines some of the functions described above for FIG. 4. Any or all of these various processors of FIG. 4 access one or more of the various memories, which may be on-chip with the processor or separate therefrom. Similar function-specific components that are directed toward communications over a network broader than a piconet (e.g., components 436, 438, 440, 442-445 and 447) may also be disposed in exemplary embodiments of the access node 320, which may have an array of tower-mounted antennas rather than the two shown at FIG. 4.

Note that the various chips (e.g., 438, 440, 442, etc.) that were described above may be combined into a fewer number than described and, in a most compact case, may all be embodied physically within a single chip.

Reestablishment procedures across eNB seams are not supported in LTE. Thus, UEs may end up ping ponging on the eNB seams and consequentially experiencing failure of reestablishment procedures, loss of data and/or extended call setup times.

Various exemplary embodiments in accordance with this invention define methods for solving the above problems. This is achieved by transferring the target C-RNTI (and/or ShortMAC-I) calculated by the target eNB to the source eNB. The source eNB may use the target C-RNTI to identify and authenticate the UE context during reestablishment. Thus, reestablishment produces may successfully be performed when the eNB seams cause ping pong scenarios. Therefore, increases in the end user experience and data throughput at eNB seams can be realized.

Reducing inactive attempts (IA) and lost calls (LC) is one of the top priorities of a service provider. Various exemplary embodiments in accordance with this invention will help to improve this IA/LC metric. Various techniques may be implemented as a proprietary enhancement to the relevant standards.

A target eNB can provides to the UE (via the source eNB) a target C-RNTI and/or a ShortMAC-I calculated for each of the candidate cells on the source eNB. The source eNB maintains a mapping table used to map the UE Contexts and the info received from the target eNB. Upon receiving a RRC Reestablishment Request message, the source eNB determines if the cell identified is the target cell and finds the matching UE Context using the mapping table. Upon successful matching of the target C-RNTI and/or message authentication code (e.g., ShortMAC-I) from the UE for the accessed cell, the source eNB proceeds with the reestablishment procedure.

During the LTE handover, the source eNodeB receives the Handover Command container from the target eNodeB that the source eNodeB transparently forwards to the UE. The source eNodeB is configured to store the new UE identity (C-RNTI) assigned by the target eNodeB in a lookup table on the source eNodeB (for example, using fields for target C-RNTI, source C-RNTI and UE context). The source eNodeB can then use this information for successful RRC reestablishment.

The lookup table may be updated to remove old C-RNTI/UE context data based on various trigger conditions. For example, the Source eNB may use a trigger which is based on an expiration timer and/or a handover success indication. The handover success indication may be an X2 UE context release or a S1AP UE context Release command message.

In a non-limiting embodiment, X2 signaling (e.g., X2-AP: HANDOVER REQUEST ACKNOWLEDGE message) is used with the target C-RNTI and source ShortMAC-I information. Alternatively, only the target C-RNTI information element is present in this message and a combination of the target PCI and the target C-RNTI may be used instead.

The source eNodeB can intercept the target C-RNTI and place it into a lookup table with the target PCI, source C-RNTI and the UE context. When a "too early handover" UE attempts to reestablish RRC, the eNB can perform a lookup and retrieve the UE context.

Figure 5:
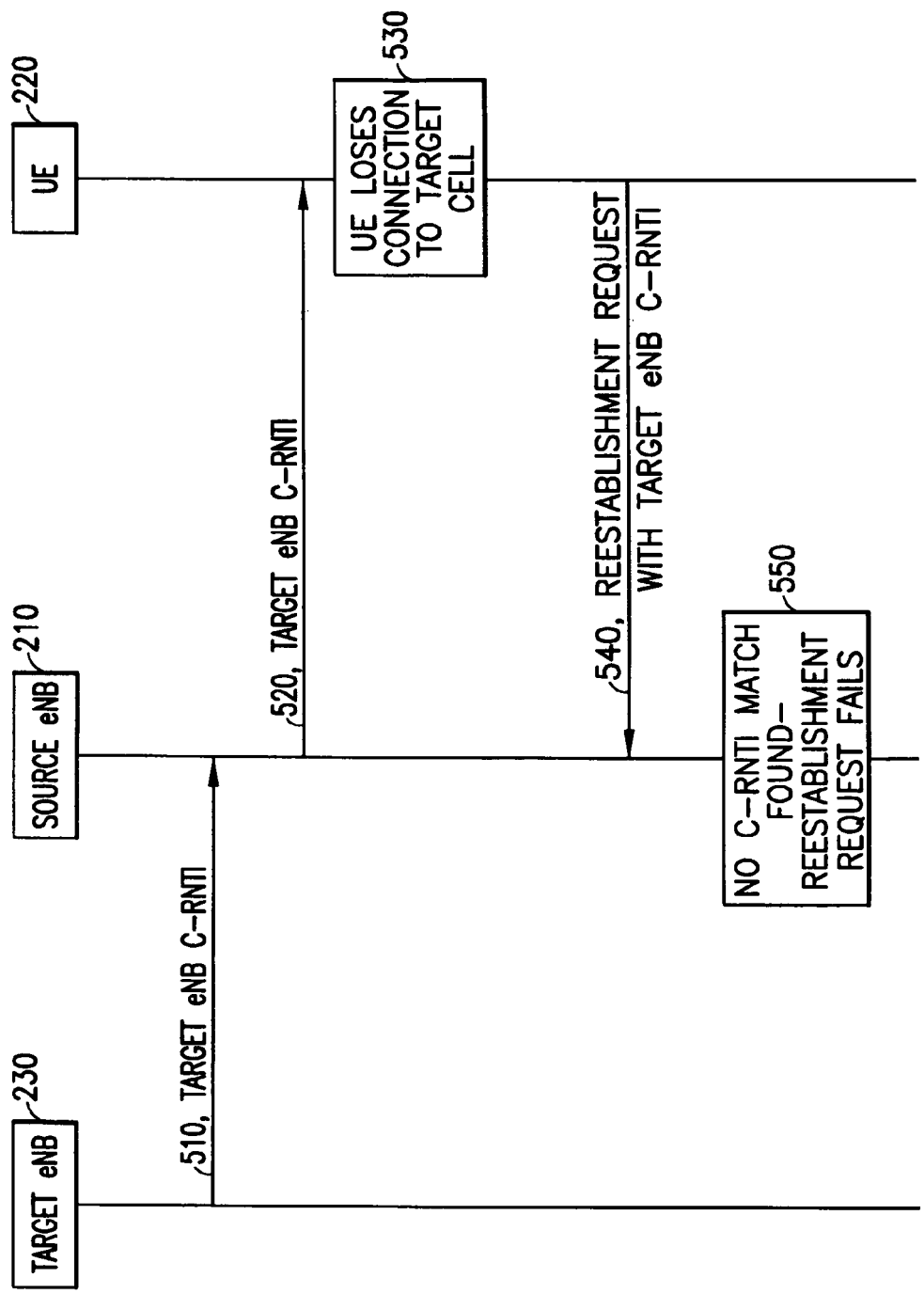
FIG. 5 demonstrates a signaling diagram where the "Too Early Handover" problem occurs.

FIG. 5 demonstrates a signaling diagram where the "Too Early Handover" problem occurs. The signaling diagram highlights a portion of the handover procedure. At time 510, the target eNB 230 provides the C-RNTI assigned by the target eNB 230 for UE 220. The source eNB 210 receives this information and relays it to the UE 220 at time 520. Then, at time 530, the UE 220 loses its connection to the target cell. Time 530 occurs before the handover is complete. Thus, UE 220 is partially configured for operation on target eNB 230. At time 540, UE 220 sends a reestablishment request to the source eNB 210; however, the UE 220 includes the target eNB C-RNTI. The source eNB 210 receives the message are attempts locate the UE context to use at time 550. Since source eNB 210 is not aware of the target eNB C-RNTI, no match is found and the reestablishment request fails.

Figure 6:
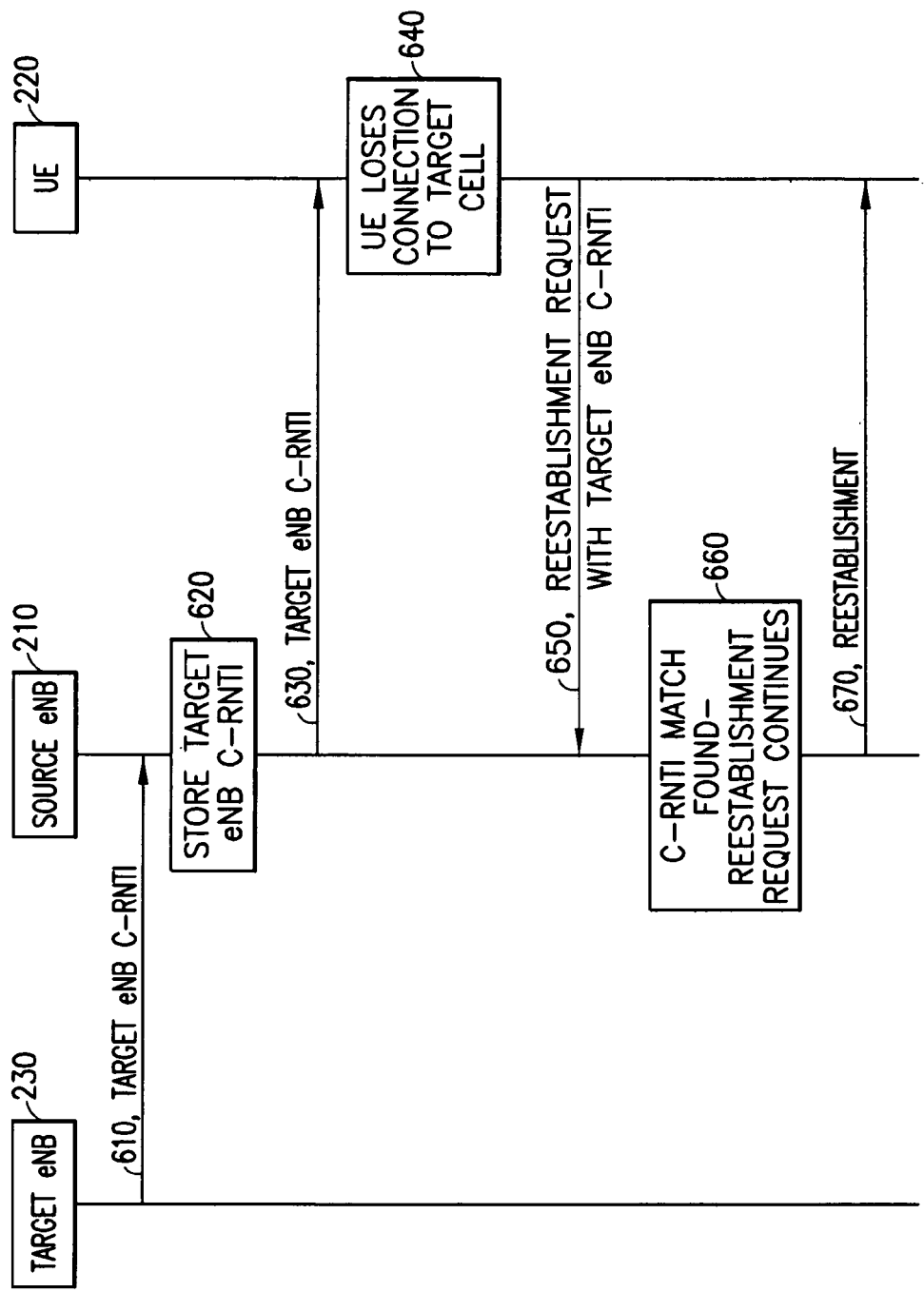
FIG. 6 demonstrates a signaling diagram in accordance with various exemplary embodiments of this invention.

FIG. 6 demonstrates a signaling diagram in accordance with various exemplary embodiments of this invention. At time 610, the target eNB 230 provides the C-RNTI assigned by the target eNB 230 for UE 220. The source eNB 210 receives this information and, at time 620, the source eNB 210 stores the target C-RNTI (for example, in a lookup table). At time 630, the source eNB 210 relays the C-RNTI to the UE 220.

The sequence of times 620 and 630 may be altered based on the needs of the system. For example the source eNB 210 may hold the target C-RNTI in a temporary memory (e.g., a buffer) while forwarding the information to the UE 220 in order to reduce delays in signaling. Then, the source eNB 210 may store the target C-RNTI in a lookup table.

At time 640, the UE 220 loses its connection to the target cell. As seen above, time 640 occurs before the handover is complete. Thus, UE 220 is partially configured for operation on target eNB 230. At time 650, UE 220 sends a reestablishment request to the source eNB 210; however, the UE 220 includes the target eNB C-RNTI.

The source eNB 210 receives the reestablishment request are attempts locate the UE context to use at time 660. The source eNB 210 searches for the UE context based on the target eNB C-RNTI (and/or the target PCI/source Short-MAC-I). The source eNB 210 locates the corresponding UE context, for example, in a lookup table and the Reestablishment procedure continues at time 670.

The source eNB, during the execution of handover, forwards the buffered UE data to the target eNB. In this embodiment, the source eNB keeps a replica of all the forwarded data so that it can be delivered to the UE in the case of successful reestablishment.

Based on the foregoing it should be apparent that the exemplary embodiments of this invention provide a method, apparatus and computer program(s) to perform successful RRC reestablishment across eNB seams in ping pong scenarios without data loss.

Figure 7:
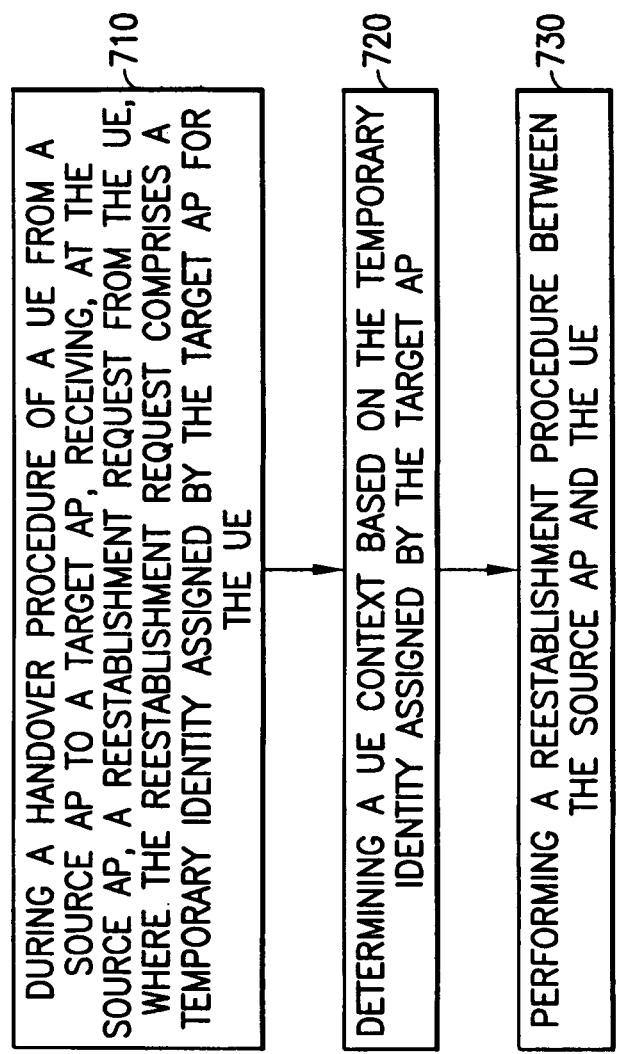
FIG. 7 is a logic flow diagram that illustrates the operation of an exemplary method, and a result of execution of computer program instructions embodied on a computer readable memory, in accordance with various exemplary embodiments of this invention.

FIG. 7 is a logic flow diagram that illustrates the operation of a method, and a result of execution of computer program instructions, in accordance with the exemplary embodiments of this invention. In accordance with these exemplary embodiments a method performs, at Block 710, a step of during a handover procedure of a UE from a source AP to a target AP, receiving, at the source AP, a reestablishment request from the UE. The reestablishment request comprises a temporary identity assigned by the target AP for the UE. At Block 720, the method performs a step of determining a UE context based on the temporary identity assigned by the target AP. The method performs a step of performing a reestablishment procedure between the source AP and the UE at Block 730.

The various blocks shown in FIG. 7 may be viewed as method steps, and/or as operations that result from operation of computer program code, and/or as a plurality of coupled logic circuit elements constructed to carry out the associated function(s).

An exemplary embodiment in accordance with this invention is a method to perform successful RRC reestablishment across eNB seams in ping pong scenarios without data loss. The method includes, during a handover procedure of a UE from a source AP to a target AP, receiving (e.g., via a receiver), at the source AP, a reestablishment request from the UE. The reestablishment request includes a temporary identity assigned by the target AP for the UE. The method also includes determining (e.g., by a processor) a UE context based on the temporary identity assigned by the target AP and performing (e.g., by a processor) a reestablishment procedure between the source AP and the UE.

In a further exemplary embodiment of the method above, determining the UE context includes obtaining the user context from a table. The table may include, for each entry: a field for a temporary identity assigned by the target AP; a field for a temporary identity assigned by the source AP; and a field for a user context. The table may also include, for each entry a field for a physical cell identity of the target AP.

In another exemplary embodiment of any one of the methods above, the temporary identity is a C-RNTI.

In a further exemplary embodiment of any one of the methods above, the reestablishment request is a RRCConnectionReconfiguration message.

In another exemplary embodiment of any one of the methods above, the method also includes, during the handover procedure, receiving, at the source AP from the target AP, a message comprising the temporary identity assigned by the target AP. The method includes storing an indication of the temporary identity assigned by the target AP and an indication of the UE context in a table. Transmitting the message from the source AP to the UE is also included in the method.

In a further exemplary embodiment of any one of the methods above, the method includes, during the handover procedure, forwarding buffered data from the source AP to the target AP and storing a copy of the buffered data at the source AP; and, in response to performing the reestablishment procedure, transmitting the buffered data to the UE.

In another exemplary embodiment of any one of the methods above, the handover procedure is from a first cell served by the source AP to a second cell served by the target AP and receiving the reestablishment request is performed by a third cell served by the source AP.

In a further exemplary embodiment of any one of the methods above, the method includes deriving, based on the UE context, security keys and/or message authentication code (short MAC-I) previously used by the UE. The security keys and/or message authentication code may be ones used in a cell of the source AP prior to the handover.

Another exemplary embodiment in accordance with this invention is an apparatus to perform successful RRC reestablishment across eNB seams in ping pong scenarios without data loss. The apparatus includes at least one processor; and at least one memory including computer program code. The at least one memory and the computer program code are configured to, with the at least one processor, cause the apparatus to perform actions. The actions include, during a handover procedure of a UE from a source AP to a target AP, to receive, at the source AP, a reestablishment request from the UE. The reestablishment request includes a temporary identity assigned by the target AP for the UE. The actions also include to determine a UE context based on the temporary identity assigned by the target AP and performing a reestablishment procedure between the source AP and the UE.

In a further exemplary embodiment of the apparatus above, determining the UE context includes obtaining the user context from a table. The table may include, for each entry: a field for a temporary identity assigned by the target AP; a field for a temporary identity assigned by the source AP; and a field for a user context. The table may also include, for each entry a field for a physical cell identity of the target AP.

In another exemplary embodiment of any one of the apparatus above, the temporary identity is a C-RNTI.

In a further exemplary embodiment of any one of the apparatus above, the reestablishment request is a RRCConnectionReconfiguration message.

In another exemplary embodiment of any one of the apparatus above, the actions also include, during the handover procedure, to receive, at the source AP from the target AP, a message comprising the temporary identity assigned by the target AP. The actions include to store an indication of the temporary identity assigned by the target AP and an indication of the UE context in a table. To transmit the message from the source AP to the UE is also included in the actions.

In a further exemplary embodiment of any one of the apparatus above, the actions include, during the handover procedure, to forward buffered data from the source AP to the target AP and to store a copy of the buffered data at the source AP; and, in response to performing the reestablishment procedure, to transmit the buffered data to the UE.

In another exemplary embodiment of any one of the apparatus above, the apparatus is embodied in an integrated circuit.

In a further exemplary embodiment of any one of the apparatus above, the apparatus is embodied in a mobile device.

In another exemplary embodiment of any one of the apparatus above, the handover procedure is from a first cell served by the source AP to a second cell served by the target AP and receiving the reestablishment request is performed by a third cell served by the source AP.

In a further exemplary embodiment of any one of the apparatus above, the actions include to derive, based on the UE context, security keys and/or message authentication code (short MAC-I) previously used by the UE. The security keys and/or message authentication code may be ones used in a cell of the source AP prior to the handover.

Another exemplary embodiment in accordance with this invention is a computer readable medium to perform successful RRC reestablishment across eNB seams in ping pong scenarios without data loss. The computer readable medium is tangibly encoded with a computer program executable by a processor to perform actions. The actions include, during a handover procedure of a UE from a source AP to a target AP, receiving, at the source AP, a reestablishment request from the UE. The reestablishment request includes a temporary identity assigned by the target AP for the UE. The actions also include determining a UE context based on the temporary identity assigned by the target AP and to perform a reestablishment procedure between the source AP and the UE.

In a further exemplary embodiment of the computer readable medium above, determining the UE context includes obtaining the user context from a table. The table may include, for each entry: a field for a temporary identity assigned by the target AP; a field for a temporary identity assigned by the source AP; and a field for a user context. The table may also include, for each entry a field for a physical cell identity of the target AP.

In another exemplary embodiment of any one of the computer readable media above, the temporary identity is a C-RNTI.

In a further exemplary embodiment of any one of the computer readable media above, the reestablishment request is a RRCConnectionReconfiguration message.

In another exemplary embodiment of any one of the computer readable media above, the actions also include, during the handover procedure, receiving, at the source AP from the target AP, a message comprising the temporary identity assigned by the target AP. The actions include storing an indication of the temporary identity assigned by the target AP and an indication of the UE context in a table. Transmitting the message from the source AP to the UE is also included in the actions.

In a further exemplary embodiment of any one of the computer readable media above, the actions include, during the handover procedure, forwarding buffered data from the source AP to the target AP and storing a copy of the buffered data at the source AP; and, in response to performing the reestablishment procedure, transmitting the buffered data to the UE.

In another exemplary embodiment of any one of the computer readable media above, the computer readable medium is a non-transitory computer readable medium (e.g., CD-ROM, RAM, flash memory, etc.).

In a further exemplary embodiment of any one of the computer readable media above, the handover procedure is from a first cell served by the source AP to a second cell served by the target AP and receiving the reestablishment request is performed by a third cell served by the source AP.

In another exemplary embodiment of any one of the computer readable media above, the actions include deriving, based on the UE context, security keys and/or message authentication code (short MAC-I) previously used by the UE. The security keys and/or message authentication code may be ones used in a cell of the source AP prior to the handover.

A further exemplary embodiment in accordance with this invention is an apparatus to perform successful RRC reestablishment across eNB seams in ping pong scenarios without data loss. The apparatus includes means for, during a handover procedure of a UE from a source AP to a target AP, receiving (e.g., a receiver), at the source AP, a reestablishment request from the UE. The reestablishment request includes a temporary identity assigned by the target AP for the UE. The apparatus also includes means for determining (e.g., a processor) a UE context based on the temporary identity assigned by the target AP and means for performing a reestablishment procedure between the source AP and the UE.

In another exemplary embodiment of the apparatus above, the determining means includes means for obtaining the user context from a table. The table may include, for each entry: a field for a temporary identity assigned by the target AP; a field for a temporary identity assigned by the source AP; and a field for a user context. The table may also include, for each entry a field for a physical cell identity of the target AP.

In a further exemplary embodiment of any one of the apparatus above, the temporary identity is a C-RNTI.

In another exemplary embodiment of any one of the apparatus above, the reestablishment request is a RRCConnectionReconfiguration message.

In a further exemplary embodiment of any one of the apparatus above, the apparatus also includes means for, during the handover procedure, receiving, at the source AP from the target AP, a message comprising the temporary identity assigned by the target AP. The apparatus includes means storing an indication of the temporary identity assigned by the target AP and an indication of the UE context in a table. Means for transmitting the message from the source AP to the UE is also included in the apparatus.

In another exemplary embodiment of any one of the apparatus above, the apparatus includes means for, during the handover procedure, forwarding buffered data from the source AP to the target AP and means for storing a copy of the buffered data at the source AP; and, in response to performing the reestablishment procedure, means for transmitting the buffered data to the UE.

In a further exemplary embodiment of any one of the apparatus above, the handover procedure is from a first cell served by the source AP to a second cell served by the target AP and receiving the reestablishment request is performed by a third cell served by the source AP.

In another exemplary embodiment of any one of the apparatus above, the apparatus includes, means for deriving, based on the UE context, security keys and/or message authentication code (short MAC-I) previously used by the UE. The security keys and/or message authentication code may be ones used in a cell of the source AP prior to the handover.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems such as for example (WLAN, UTRAN, GSM as appropriate).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters/procedures (e.g., the RRCReconfiguration message, RRC reestablishment, etc.) are not intended to be limiting in any respect, as these parameters may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
during a handover procedure of a user equipment from a source access point to a target access point, receiving, at the source access point, a reestablishment request from the user equipment, where the reestablishment request comprises a temporary identity assigned by the target access point for the user equipment;
determining at the source access point a user equipment context based on the temporary identity assigned by the target access point; and
performing at the source access point a reestablishment procedure between the source access point and the user equipment.

2. The method of claim 1, where determining the user equipment context comprises obtaining the user context from a table.

3. The method of claim 2, where the table comprises, for each entry: a field for a temporary identity assigned by the target access point; a field for a temporary identity assigned by the source access point; and a field for a user context.

4. The method of claim 3, where the table further comprises, for each entry a field for a physical cell identity of the target access point.

5. The method of claim 1, where the temporary identity is a cell radio network temporary identity.

6. The method of claim 1, where the reestablishment request is a RRCConnectionReconfiguration message.

7. The method of claim 1, further comprising:
during the handover procedure, receiving, at the source access point from the target access point, a message comprising the temporary identity assigned by the target access point;
storing an indication of the temporary identity assigned by the target access point and an indication of the user equipment context in a table; and
transmitting the message from the source access point to the user equipment.

8. The method of claim 1, further comprising:
during the handover procedure, forwarding buffered data from the source access point to the target access point and storing a copy of the buffered data at the source access point; and
in response to performing the reestablishment procedure, transmitting the buffered data to the user equipment.

9. The method of claim 1, where the handover procedure is a handover from a first cell served by the source access point to a second cell served by the target access point and receiving the reestablishment request is performed by a third cell served by the source access point.

10. The method of claim 1, further comprising deriving, based at least in part on the user equipment context, at least one of at least one security key and a short message authentication code previously used by the user equipment.

11. An apparatus, comprising at least one processor; and at least one memory including computer program code, the at least one memory and the computer program code configured to, with the at least one processor, cause the apparatus to perform at least the following:

during a handover procedure of a user equipment from a source access point to a target access point, to receive, at the source access point, a reestablishment request from the user equipment, where the reestablishment request comprises a temporary identity assigned by the target access point for the user equipment;

to determine at the source access point a user equipment context based on the temporary identity assigned by the target access point; and to perform at the source access point a reestablishment procedure between the source access point and the user equipment.

12. The apparatus of claim 11, where, when determining the user equipment context, the at least one memory and the computer program code are further configured to cause the apparatus to obtain the user context from a table.

13. The apparatus of claim 11, where the at least one memory and the computer program code are further configured to cause the apparatus:

during the handover procedure, to receive, at the source access point from the target access point, a message comprising the temporary identity assigned by the target access point;

to store an indication of the temporary identity assigned by the target access point and an indication of the user equipment context in a table; and to transmit the message from the source access point to the user equipment.

14. The apparatus of claim 11, where the at least one memory and the computer program code are further configured to cause the apparatus:

during the handover procedure, to forward buffered data from the source access point to the target access point and to store a copy of the buffered data at the source access point; and in response to performing the reestablishment procedure, to transmit the buffered data to the user equipment.

15. A non-transitory computer readable medium tangibly encoded with a computer program executable by a processor to perform actions comprising:

during a handover procedure of a user equipment from a source access point to a target access point, receiving, at the source access point, a reestablishment request from the user equipment, where the reestablishment request comprises a temporary identity assigned by the target access point for the user equipment;

determining at the source access point a user equipment context based on the temporary identity assigned by the target access point; and performing at the source access point a reestablishment procedure between the source access point and the user equipment.

16. The non-transitory computer readable medium of claim 15, where determining the user equipment context comprises obtaining the user context from a table.

17. The non-transitory computer readable medium of claim 15, further comprising: during the handover procedure, receiving, at the source access point from the target access point, a message comprising the temporary identity assigned by the target access point; storing an indication of the temporary identity assigned by the target access point and an indication of the user equipment context in a table; and transmitting the message from the source access point to the user equipment.

18. The non-transitory The computer readable medium of claim 15, further comprising: during the handover procedure, forwarding buffered data from the source access point to the target access point and storing a copy of the buffered data at the source access point; and in response to performing the reestablishment procedure, transmitting the buffered data to the user equipment.

19. An apparatus comprising:
at least one radio frequency receiver;
at least one data processor connected with the radio frequency receiver; and
at least one memory connected with the at least one processor, the at least one memory storing computer program instructions that are readable by the at least one processor, where execution of the computer program instructions b the at least one processor results in performance of operations that comprise,
during a handover procedure of a user equipment from a source access point to a target access point, receiving with the radio frequency receiver at the source access point, a reestablishment request from the user equipment, where the reestablishment request comprises a temporary identity assigned by the target access point for the user equipment;
determining at the source access point a user equipment context based on the temporary identity assigned by the target access point; and
performing at the source access point a reestablishment procedure between the source access point and the user equipment.

20. The apparatus of claim 19, where the operation of determining comprises the at least one data processor obtaining the user context from a table.

* * * * *